July 31, 1945.    C. J. McDONOUGH    2,380,603
VARIABLE CONDENSER
Filed Sept. 23, 1942
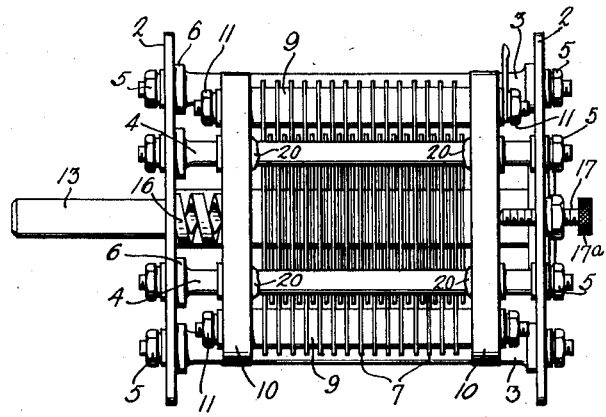
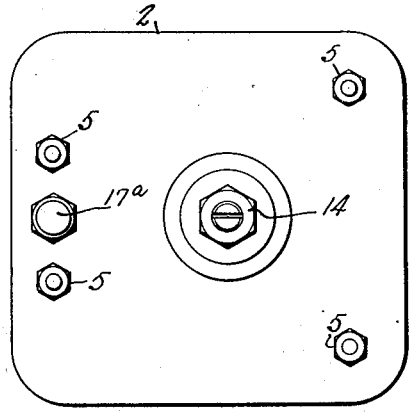
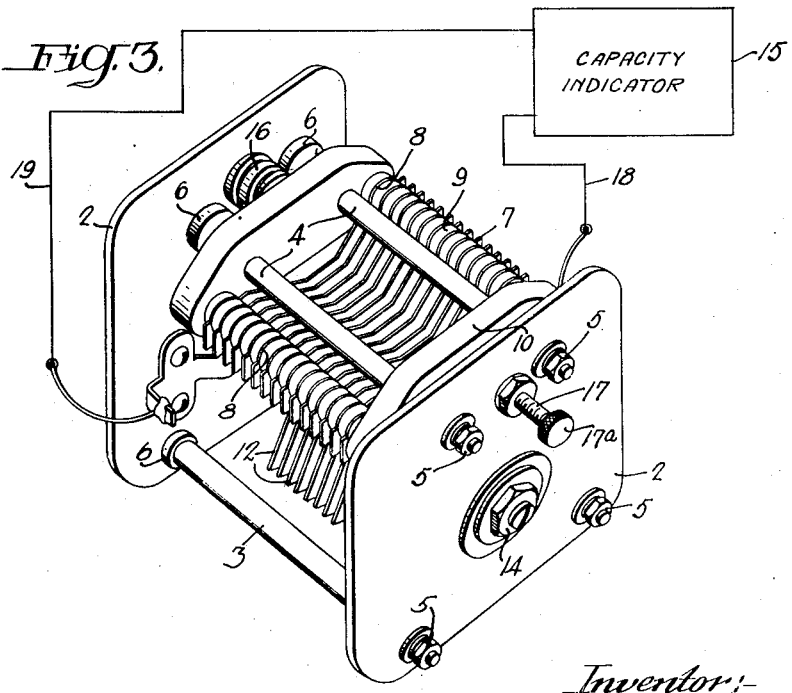
Inventor:-
Charles J. McDonough
by his Attorneys
Howson & Howson Patented July 31, 1945

2,380,603

UNITED STATES PATENT OFFICE 2,380,603

VARIABLE CONDENSER

Charles J. McDonough, Philadelphia, Pa., assignor to Philco Radio and Television Corporation, Philadelphia, Pa., a corporation of Delaware Application September 23, 1942, Serial No. 459,406

1 Claim. (Cl. 175—41.5)

This invention relates to variable condensers and to an improved method for effecting adjustment of said condensers to a predetermined capacity value.

More particularly, the present invention is concerned with such a method useful in the manufacture of that type of high precision condensers which employ a plurality of stator plates mounted for adjustment movements, as a unit, parallel to the rotational axis of the rotor. The invention is also concerned with the provision of a high precision condenser of the above type, which is adapted for adjustment in accordance with the novel method herein disclosed.

In this type of apparatus the stator plates have been supported on an insulated carriage, which is mounted on suitable guide means for reciprocation in such a sense as to effect axial adjustment of the stator plates relative to the plates of the rotor, while maintaining exact parallelism with said rotor plates. Heretofore, adjustment of such condensers was effected by a relatively complicated method involving a combination of critical and carefully controlled mechanical steps and electrical observations.

As will be understood, in the quantity production of variable condensers, for the purposes of standardization, it is desirable that all units be identical in capacity and calibration. This has been accomplished by constructing the condensers of precision parts and adjusting all of them to a certain desired capacity value, with, for example, the plates completely closed. It is with this adjustment that the present invention is primarily concerned, and, in the interests of a better understanding of the invention, the old method for effecting such adjustment will be briefly described here.

This method comprised rotating the rotor until its plates were completely interleaved with those of the stator, inserting suitable removable spacers between adjacent stator and rotor plates to center the rotor plates mechanically with respect to those of the stator, fixing the stator carriage against further movement, and then bending the individual plates, until the desired capacity value had been reached at all rotational positions of the condenser.

This method was subject to certain objections and difficulties, perhaps the most important of which was that it was tedious and time-consuming, and that the adjustment effected thereby was impermanent, the result being that the capacities of various condensers would vary under conditions met in use. This variation was accentuated by the fact that the alloy steel (customarily used in precision units for its low temperature coefficient of expansion) was highly resilient. As a result, excessive capacity drift was encountered as the deformed plates returned toward their original position over a period of time. This was further emphasized when the condensers were used under the widely differing temperature conditions encountered, for example, in aircraft apparatus.

With the above in mind, it is therefore the primary object of the present invention to provide an improved method for establishing permanently the desired capacity value in high precision variable condensers.

More particularly, the invention has as an object the provision of a method in which the necessity for bending of individual plates is obviated, and the desired capacity value is established by effecting axial adjustment of the stator plates as a unit.

The invention further contemplates the provision of a high precision condenser having certain novel structural features which adapt it for adjustment in accordance with the method herein disclosed.

These, together with other objects and advantages, will be best understood by reference to the following description in the light of the accompanying drawing, in which:

Fig. 1 is a plan view of a condenser constructed in accordance with this invention and adapted for the practice of the present method;

Fig. 2 is an elevational view taken from the right of Fig. 1; and

Fig. 3 is a perspective view of the condenser shown associated with suitable capacity indicating apparatus.

Referring now more particularly to the drawing, it will be seen that the condenser illustrated comprises a pair of rigid mounting end plates 2—2, into which two pairs of mounting rods 3—3 and 4—4 are connected, as by means of nut and washer assemblies, indicated generally by the reference character 5. These rods are provided with shoulder portions 6 which constitute a bearing surface providing a rigid assembly when the nuts are tightened.

It might be noted that, with the exception of the mounting plates, this type of condenser is preferably constructed of material having a low temperature coefficient of expansion, and the parts may be plated or coated with some corrosion resistant material.

In addition to supplying strength and rigidity to the assembly, the rods 4—4 constitute guide members on which the stator is mounted for reciprocation adjustment between the end plates, as will now be described.

The stator assembly comprises a plurality of plates 7 which, in accordance with usual practice, are soldered into peripheral grooves 8 (see Fig. 3) provided along the length of a pair of plate assembly rods 9—9. It will be understood that the plates should be mounted at exactly right angles to the longitudinal axis of the rods 9—9, to maintain proper parallelism therebetween and to insure a parallel relationship between said plates and the rotor plates, as will be later set forth.

Rods 9—9 have end portions of reduced diameter fixed in carriage or "set-off" plates 10—10, by means of nuts 11. These carriage plates are constructed of insulating material, for example, some suitable ceramic, and are apertured to provide a smooth sliding fit on the rods 4—4. Thus the entire stator assembly is movable as a unit along rods 4—4.

The condenser rotor comprises a plurality of plates 12 (best seen in Fig. 3), which are fixed to the usual adjustable shaft 13, which is in turn journalled, as at 14, in end plates 2.

As is customary, the rotor plates are adjustable with respect to the stator, between positions completely interleaved with and completely clear of the stator.

As the shaft 13 and the rods 4—4 and 9—9 are mounted in parallel relation, and as the plates of both the rotor and stator are set at right angles to these supporting elements, the rotor plates will be maintained in the desired parallelism with those of the stator during sliding movements of the stator as a unit, as well as during rotational movements of the shaft 13.

As will be fully understood when the present method is described, the stator is adjusted along the rods 4 while observations are made of the capacity indicated on a suitable measuring device, diagrammatically shown at 15 in Fig. 3. Leads 18 and 19 serve to connect the indicator with the plates of the stator and rotor respectively. To effect this stator movement, the following mechanism is provided.

An expansion spring 16 is seated between one end plate 2 and the adjacent carriage member 10 to react therebetween, while a screw 17, preferably provided with a knurled head 17a, is adjustably mounted in the opposite end plate and is adapted to bear against the carriage member 10 at the opposite end of the stator assembly. This arrangement subjects the stator to opposed forces which may be readily and accurately controlled to effect micrometric adjustment of the stator in either direction. Thus, rotation of screw 17 will move the stator plates axially with relation to those of the rotor, varying the capacity between the several plates, and thereby the capacity of the condenser as a whole.

Turning now to a more detailed consideration of the novel method of the present invention, reference is made to Fig. 3. As has been indicated, the axial adjustment of the stator with respect to the rotor is made while observing, through the medium of the capacity measuring device 15, the capacity of the condenser with different axial adjustments of the stator. This observation is preferably made with the plates completely closed. Obviously when the rotor plates are electrically centered with respect to the stator plates, minimum capacity will be obtained. If the plates are perfectly plane and parallel to one another, and are made of entirely homogeneous material, this electrical centering will correspond to mechanical centering. However, since unavoidable variations in materials are bound to occur, this correspondence does not always obtain.

In accordance with this invention, the stator may be adjusted axially by turning the screw 17 to a point where the device 15 gives a minimum capacity indication, that is, the indication which corresponds to precise electrical centering of the condenser unit. However, in accordance with preferred practice of this invention, the stator is moved until it reaches a setting where the device indicates some predetermined electrical capacity which is slightly greater than the minimum capacity of the average production sample. This latter practice is preferable since the minimum capacity of some units will be a lesser value than that of others, and it is necessary to calibrate against some value within the range of all.

Following the above described adjustment, the setting may be made permanent by depositing a drop of solder on each of the rods 4, said solder being in contact with the inner faces of the stator carriage members 10. These soldered points are shown at 20 in Fig. 1, and it will be evident that they effectively prevent further movement of the stator along the rods 4.

The capacity measuring device 15 need not be particularly described here, as it forms no part of the present invention, per se. However, it should be noted that it may conveniently be a high precision capacity bridge or capacity meter. Alternatively, the device may comprise an oscillator unit and frequency meter, the condenser under test being connected as a frequency determining element of the oscillator, and being adjusted to a point where a predetermined frequency is obtained.

From the foregoing it will be seen that this invention provides an improved high precision condenser which may be very readily adjusted to any predetermined capacity value. The adjustment method of the present invention will be seen to be simple and accurate and to result in the degree of permanence required in high precision work under adverse and varying conditions. Further, this method avoids the necessity of adjusting the plates at a number of positions of rotor rotation, as is required with the old method where the plates are bent somewhat out of their proper plane of parallelism.

While a particular embodiment has been illustrated and described, it is evident that the invention is susceptible of certain modifications, without departing from the spirit thereof. For example, the rotor might be axially adjustable with respect to the stator, the adjusting screw and spring may take some other form; or, as far as the method is concerned, the elements for effecting axial adjustment might be carried by some suitable fixture, rather than by the condenser itself. However, it will be understood that the invention contemplates such changes and modifications as may fall within the scope of the appended claim.

I claim:

A high precision variable condenser comprising a framework including relatively spaced end plates and a pair of parallel spaced rods extending between said plates at right angles thereto, a rotor blade unit rotatably journalled in said end plates, a stator blade unit interposed between said end plates for cooperation with the rotor blade unit and including end members paralleling said end plates, said end members spanning said rods and being slidably mounted thereon for rectilinear movement between said end plates, a spring element interposed between one end plate of the framework and the adjacent end member of the stator blade unit and adapted to engage said end member at a point centrally between said rods for bodily moving said stator in one direction, and an adjustable element interposed between the other end plate of the framework and the adjacent end member of the stator unit and adapted to engage the latter end member at a point centrally between the rods for bodily moving the stator blade unit in the other direction against the action of said spring element.

CHARLES J. McDONOUGH.